United States Patent [19]

Hanson et al.

[11] Patent Number: 4,729,101
[45] Date of Patent: Mar. 1, 1988

[54] METHOD FOR IDENTIFYING AND SEPARATING THE EFFECTS OF ELASTIC AND ANELASTIC FORMATION PROPERTIES IN SEISMIC DATA

[75] Inventors: Kenneth E. Hanson, Broken Arrow; Christopher Crowe, Tulsa; Albert L. Frisillo; Carl H. Sondergeld, both of Broken Arrow; Leon A. Thomsen, Tulsa, all of Okla.

[73] Assignee: Standard Oil Company, Chicago, Ill.

[21] Appl. No.: 732,467

[22] Filed: May 9, 1985

[51] Int. Cl.$^4$ .......................... G01V 1/30; G01V 1/32
[52] U.S. Cl. ....................................... 364/421; 367/38
[58] Field of Search ............................. 364/421, 420; 367/60-63, 40, 46, 38

[56] References Cited

U.S. PATENT DOCUMENTS

| | | | |
|---|---|---|---|
| 3,581,274 | 5/1971 | Ruehle | 367/43 |
| 4,380,059 | 4/1983 | Ruehle | 367/46 |
| 4,403,313 | 9/1983 | Garotta | 367/61 |
| 4,500,978 | 2/1985 | Ziolkowski et al. | 367/142 |

OTHER PUBLICATIONS

Averbuch et al, 1972, Reflection and Refraction of Plane Waves Normally Incident on the Boundary of Absorbing Media; Phys of Solid Earth, No. 9, 616–621.
C. Crowe et al, 1974, "Amplitudes of Seismic Events and Their Dependence on the Absorption–Dispersion Pairs of the Media: Soc. of Expl. Geophys., #44.
Taner, M. T. et al; 1979, Complex Seismic Trace Analysis; Geophysics, vol. 44, 1041–1063.
Levy, S. et al, 1982, "The Deconvolution of Phase–Shifted Wavelets", Geophysics, vol. 47, 1285–1294.
Bourbie, T. et al, 1984, "Effects of Attenuation on Reflections", Journal of Geophysical Research, vol. 89, 6197–6202.

*Primary Examiner*—Jerry Smith
*Assistant Examiner*—Charles B. Meyer
*Attorney, Agent, or Firm*—Timothy D. Stanley

[57] ABSTRACT

The present invention relates to a method for identifying and separating the effects of elastic and anelastic formation properties in a seismic signal representative of the earth's response to seismic energy imparted therein. The seismic signal is decomposed into a measure of the absorptive contrast and impedance contrast across reflecting boundaries in the earth's subterranean formations. The resulting measures of impedance contrast can be used to obtain a measure of the earth's elastic properties. The resulting measures of the absorptive contrast can be used to obtain measures of the earth's anelastic properties.

33 Claims, 6 Drawing Figures

METHOD FOR IDENTIFYING AND SEPARATING THE EFFECTS OF ELASTIC AND ANELASTIC FORMATION PROPERTIES IN SEISMIC DATA

BACKGROUND OF THE INVENTION

The present invention relates generally to the field of processing and displaying seismic data. More particularly, the present invention is directed to a novel method for identifying and separating the effects of elastic and anelastic formation properties in seismic reflection data.

Broadly, seismic exploration comprises imparting seismic wave energy into the earth's subterranean formations and detecting the earth's response thereto with a plurality of geophones. Geophones produce an electrical signal containing information on the earth's subterranean formations. Such electrical signals can be processed and displayed as seismic sections having a plurality of traces or seismic signals thereon representative of the processed electrical signals from which geophysicists can make interpretations of the earth's subterranean formations.

As seismic wave propagates through the earth's subterranean formations, its energy is dissipated as a function of distance traveled due to wave front spreading, absorption, and partitioning of the seismic energy at reflecting boundaries.

In terms of a propagating sinusoidal signal, such as a seismic signal, the decrease in seismic energy due to absorption over a distance L can be described according to:

$$A = A_o e^{-\alpha L} \quad (1)$$

where $A_o$ is the initial signal amplitude, and $\alpha$ is the absorption coefficient over the distance traveled.

The absorption coefficient $\alpha$ is defined in terms of the decrease of signal amplitude per unit distance. Other measurements of absorptive loss per cycle can be characterized by the following:

$$A = A_o e^{-\delta} \quad (2)$$

where $\delta =$ (logarithmic decrement) $= \alpha \lambda$
where $\lambda =$ wavelength $= V/f$ ($V =$ velocity, $f =$ frequency)

Partitioning of the seismic wave energy at reflecting boundaries depends on the elastic properties (e.g., density and seismic wave velocities) and the anelastic properties (e.g., absorptive loss) of the formation on either side of the reflecting boundary and the angle of incidence and frequency content of the seismic wave. In perfectly elastic formations, partitioning depends only on the elastic properties of the formations on either side of a reflecting boundary, and also on the angle of incidence of the seismic wave with respect to the reflecting boundary.

For perfectly elastic media, the relationship which governs partitioning at a reflecting boundary is given by the following (for normal incidence):

$$A_R/A_i = \frac{\rho_2 V_2 - \rho_1 V_1}{\rho_2 V_2 + \rho_1 V_1} \quad (3)$$

where
$\delta_i$ is the density of the ith formation,
$V_i$ is the seismic velocity of the ith formation, and
$A_R/A_i$ is the ratio of the reflected to incident signal amplitude.

As used herein, a contrast in either elastic or anelastic properties across a reflecting boundary in the earth's subterranean formations is understood to comprehend a difference in the elastic or anelastic properties of the earth's subterranean formations on either side of the reflecting boundary. Similarly, an impedance or absorptive contrast across a reflecting boundary in the earth's subterranean formations is understood to comprehend a difference in the impedance or absorptive properties of the earth's subterranean formations on either side of the reflecting boundary.

Present seismic signal analysis techniques are predicated upon the assumption that only elastic contrasts affect the partitioning of seismic wave energy (amplitude and phase of the reflected and transmitted seismic energy) for subcritical incidence, i.e., it assumes perfectly elastic subterranean formations. In such case, changes in the phase of the seismic signal at simple reflecting boundaries can only be either 0° or 180°. However, for a compound reflection, i.e., from a thin subterranean bed, e.g., generally less than ¼ wavelength in thickness may also produce intermediate phase changes. However, when anelastic contrasts are considered, as disclosed herein, the change in phase can take on a range of values between 0° and 360°. As such, the present techniques for processing seismic signals from subterranean formations in which significant anelastic contrasts exist across a reflecting boundary are simply in error.

The present invention discloses a technique whereby the effects of impedance and absorptive contrasts within the earth's subterranean formations on a seismic signal can be separately decomposed. The resultant decompositions can be more properly analyzed in terms of the elastic and anelastic properties of the earth's subterranean formations. Additionally, comparison of the resultant decompositions of the seismic signal into its elastic component and anelastic component can provide a measure of the error in a seismic signal which assumes only elastic contrasts across reflecting boundaries; or equivalently, a measure of the earth's subterranean formations absorptive properties. The present invention also discloses a method for distinguishing a gas containing formation from a similar formation containing a liquid.

SUMMARY OF THE INVENTION

The present invention is generally related to the field of processing and displaying seismic data. A novel method is provided for separately determining the elastic and anelastic properties of the earth's subterranean formations from seismic signals representative of the earth's response to imparted seismic energy.

The earth's response to the imparted seismic energy is typically recorded as a seismic signal and processed and plotted as wiggle traces, comprising a seismic section. The recorded seismic signal can be deconvolved to remove the effect of the seismic source, thereby obtaining a representation of the earth's subterranean formation response to the imparted seismic energy. An analytical signal is formed therefrom, comprising a combination of the deconvolved seismic signal and its Hilbert transform. Maxima in the envelope of the analytic signal are located. A response phase of the reflections from the earth's subterranean formation is determined from the instantaneous phase of the analytic signal at maxima in the analytic signal envelope. Elastic and anelastic component signals are separately obtained from the deconvolved signal and its Hilbert transform and response phase. By comparing plots of the anelastic and elastic responses of the earth's subterranean formation to the imparted seismic energy, estimates of the earth's subterranean formation densities, velocities and absorptive losses can be obtained.

DESCRIPTION OF THE PREFERRED EMBODIMENT

The present invention generally relates to a method for processing and displaying seismic data. More particularly, a novel method is provided for separately obtaining a representation of elastic properties and anelastic properties within the earth's subterranean formations from a seismic signal representative of the earth's response to imparted seismic wave energy.

The conventional method for measuring and displaying seismic wave energy partitioning at reflection boundaries deals only with the amplitude of the seismic signal. In the process, it is assumed that the partitioning of the seismic energy which occurs at reflecting boundaries, depends only on the elastic properties of the earth's subterranean formations. However, the present invention discloses that reflection partitioning of the seismic wave energy depends on the anelastic properties, as well as the elastic properties of the formations on either side of the reflecting boundary. As a result, measurements of formation impedance from only the amplitude of seismic reflection signals, e.g., the amplitude of wiggle traces in conventional seismic sections, are in error.

The present invention discloses a method whereby the effects of elastic and anelastic contrasts at reflecting boundaries on seismic wave propagation can be separately obtained from a seismic signal representative of the earth's response to imparted seismic energy. By appropriately decomposing the recorded seismic signal, a signal representative of the earth's anelastic contrasts alone can be obtained to produce a measurement and display of the effect of absorption. The anelastic contrasts can be interpreted in terms of the absorptive properties of the subterranean formations, including fluid content of the rock-fluid system. By removing the anelastic component signal from the seismic signal, the elastic component signal alone can then be analyzed in the conventional manner of seismic data processing and interpretation, but without the error which arises from the absorptive properties of the subterranean formations. Comparison of seismic sections produced from the decomposed seismic signal, i.e., elastic component signals and anelastic component signals, can indicate the degree to which conventional seismic sections are in error.

The recorded seismic signal and its representative graphic wiggle trace, after correction for the seismic source characteristics, frequency-dependent instrument response and wavefront spreading, represents the earth's response to seismic energy after transmission through the subterranean formation and transmission and reflection across numerous reflecting boundaries. The character of the recorded seismic signal and its wiggle trace are the result of both the elastic and anelastic properties of the earth's subterranean formations. The present method provides a technique for decomposing the recorded seismic signal into components representing the elastic and anelastic properties of the earth.

Figure 1:
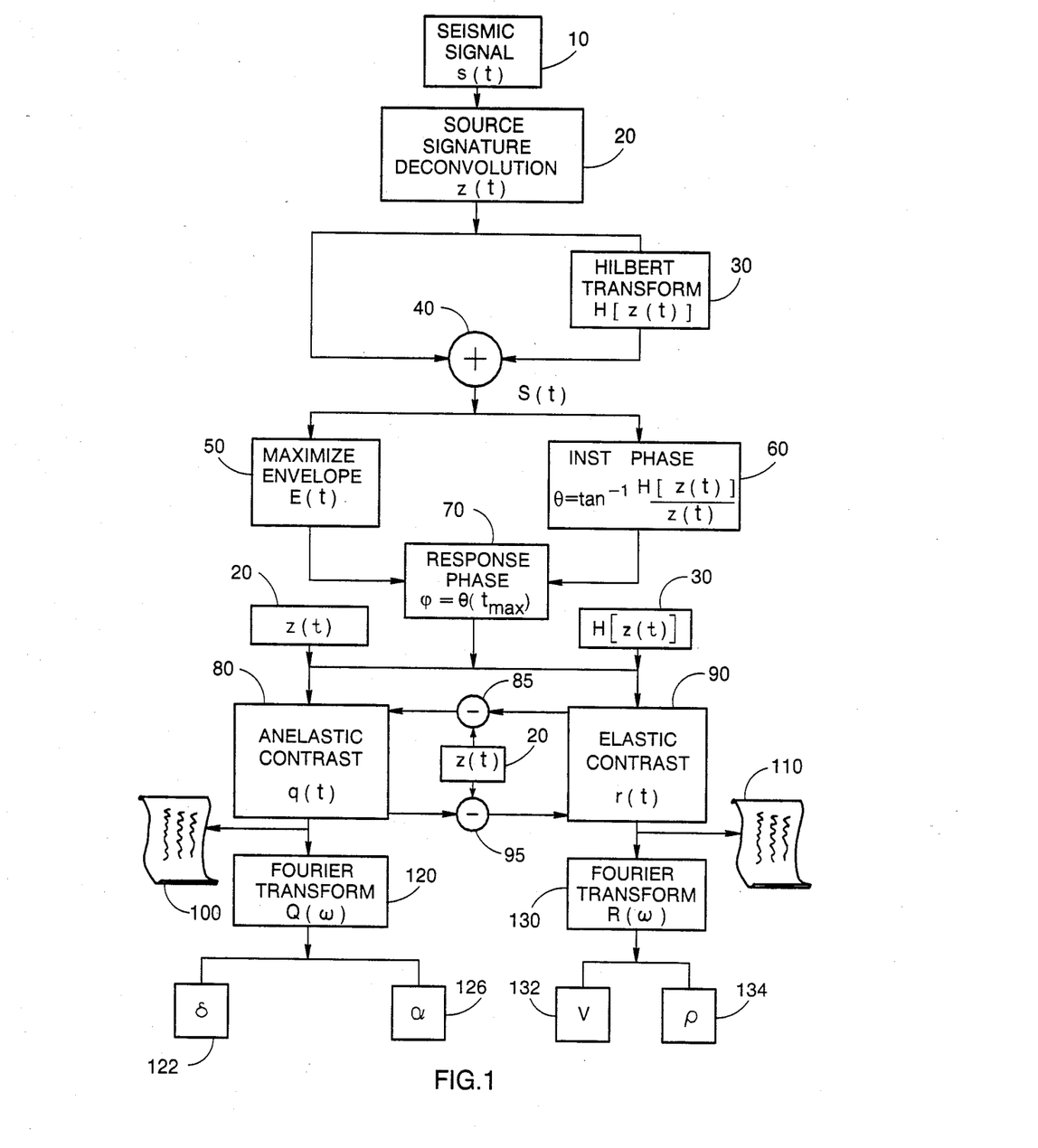
FIG. 1 is a process flow diagram of the present invention.

Referring now to FIG. 1, a flow diagram of the present invention, a seismic signal s(t) is generated at 10 using a plurality of seismic sources to impart seismic wave energy into the earth's subterranean formations and a plurality of seismic receivers to generate electric signals representative of the earth's response thereto. The seismic signals s(t) can be approximated as the result of the interaction of the seismic source excitation w(t) and a reflection coefficient series d(t) representative of reflecting boundaries in the earth's subterranean formation. This interaction can be represented mathematically as the convolution operation:

$$s(t) = w(t) * d(t) \tag{4}$$

where t = time

In perfectly elastic media (i.e., no absorption), a seismic wave which is reflected upon normal incidence at an impedance boundary is either 0° (in-phase) or 180° (out-of-phase) with the incident seismic wave, depending upon whether or not the incident seismic wave is in the medium with the smaller impedance. Although the equation does not explicitly include additive noise, those skilled in the art would appreciate from the foregoing discussion that additive noise can be included and dealt with by conventional techniques. The impedance of a medium is understood to comprise the product of the medium density $\rho$ and the seismic wave velocity V in the medium as seen in equation (3). The seismic wave does not undergo a change in phase on transmission through such a reflecting boundary. If an absorptive medium is present on one side or the other or both sides of a reflecting boundary, partitioning of the seismic wave energy is a function of the density, velocity, and absorptive properties of the media on either side of the reflecting boundary causing the reflection amplitude to be greater than in perfectly elastic media and the phase of the reflection to take on a range of possible values between 0° and 360°.

The effect of seismic source excitation w(t) can be removed at 20 by processing the seismic signal s(t) with a source-signature deconvolution to obtain a deconvolved signal z(t). That is, z(t) is the deconvolved estimate of the reflection coefficient series contained within the original seismic signal s(t).

The deconvolved signal z(t) can be regarded as the sum of two independent signals:

$$z(t) = r(t) + q(t) \quad (5)$$

where the signal r(t) represents the in-phase or elastic component and q(t) represents the out-of-phase or anelastic component of the earth's subterranean formations to the imparted seismic wave energy w(t).

With a Hilbert transform of the deconvolved signal z(t) at 30 and by use of adder 40, an analytic signal S(t) can be defined as follows:

$$S(t) = z(t) + iH[z(t)] \quad (6)$$

where H[z(t)] is the Hilbert transform of the deconvolved signal z(t) and $i = \sqrt{-1}$.

The envelope of the analytical signal E(t) can be defined as:

$$E(t) = [z(t)^2 + H[z(t)]^2]^{\frac{1}{2}} \quad (7)$$

Maxima in the envelope E(t) as a function of time are located at 50. Additionally, the instantaneous phase $\theta(t)$ of the analytical signal S(t) can be determined at 60 according to:

$$\theta(t) = \arctan[H(z(t))/z(t)] \quad (8)$$

Evaluation of the instantaneous phase $\theta(t)$ at the maxima in the envelope E(t) provides for determination of the reflection response phase $\phi$ according to:

$$\phi = \theta(t_{max}) \quad (9)$$

where $t_{max}$ are the times at which the envelope E(t) of the analytical signal S(t) are at maxima.

Now using the response phase $\phi$ determined at 70 and the deconvolved signal z(t) and its Hilbert transform H[z(t)] from 20 and 30, respectively, a signal q(t) representative of the absorptive contrast across reflecting boundaries and a signal r(t) representative of the impedance contrast across reflecting boundaries can be determined at 80 and 90, respectively. Where the phase changes due to thin subterranean beds can be distinguished, then the absorptive component signal q(t) can represent the absorption in the subterranean formations at the reflection boundary. The absorptive component signal q(t) is representative of the anelastic properties of the earth's subterranean formation if phase shifts in the seismic signal s(t) generated at reflecting boundaries are independent of frequency and can be determined according to:

$$q(t) = \sin^2\phi \cdot z(t) + \sin\phi \cdot \cos\phi \cdot H[z(t)] \quad (10)$$

The impedance component signal r(t) is representative of the elastic properties of the earth's subterranean formations if phase shifts in the seismic signal s(t) generated at reflecting boundaries are independent of frequency and can be determined according to:

$$r(t) = \cos^2\phi \cdot z(t) - \sin\phi \cdot \cos\phi \cdot H[z(t)] \quad (11)$$

Thus, the absorptive component signal q(t) and the impedance component signal r(t) can be obtained from measures of the original recorded seismic signal s(t), i.e., z(t), H[z(t)], and $\phi$. Alternatively, once the absorptive component signal q(t) is determined, the impedance component signal r(t) can be determined or vice versa according to:

$$q(t) = z(t) - r(t) \quad (12)$$

or $$r(t) = z(t) - q(t) \quad (13)$$

as indicated by the use of subtracters 85 and 95, respectively.

Seismic sections having wiggle traces representative of the impedance component signals r(t) only and absorptive component signals q(t) only can be produced at 110 and 100, respectively. Equivalently, all or part of this decomposition can be accomplished in the frequency domain using standard Fourier transformations. The impedance contrast signal r(t) contains the contribution to the deconvolved signal z(t) of the elastic properties (density and velocity). Whereas, the absorptive contrast signal q(t) contains the contribution of the anelastic properties (absorptive loss or logarithmic decrement) on transmission through formations and across reflecting boundaries. The absorptive contrast signal q(t) at reflecting boundaries would be zero if the earth were truly elastic or if the absorptive contrast were zero. In fact, there is always some absorptive contrast in the earth, and, as such, the absorptive contrast signal q(t) contains the contribution to the deconvolved signals z(t) of the anelastic properties of the earth's subterranean formations.

The exploration geophysicist can now regard the impedance contrast signals r(t) and seismic sections produced therefrom in terms of the formation elastic parameters, density and velocity, i.e., Eq. (3). Previously he has used the deconvolved signal z(t) to produce seismic sections to do this, but now he is able to obtain seismic formation impedance contrast estimates more accurately because the effect of formation absorptive properties on the deconvolved signal z(t) have been removed. In addition, he can now evaluate the absorptive contrast signal q(t) and its resulting seismic section in terms of the anelastic characteristics of the subterranean formation. That is, in terms of logarithmic decrement $\delta$, or the absorption coefficient $\alpha$, i.e. Eqs. (1 or 2) Q. He was not able to do this previously because his models of the reflecting process did not include the absorptive properties of the earth's subterranean formations.

Figure 2:
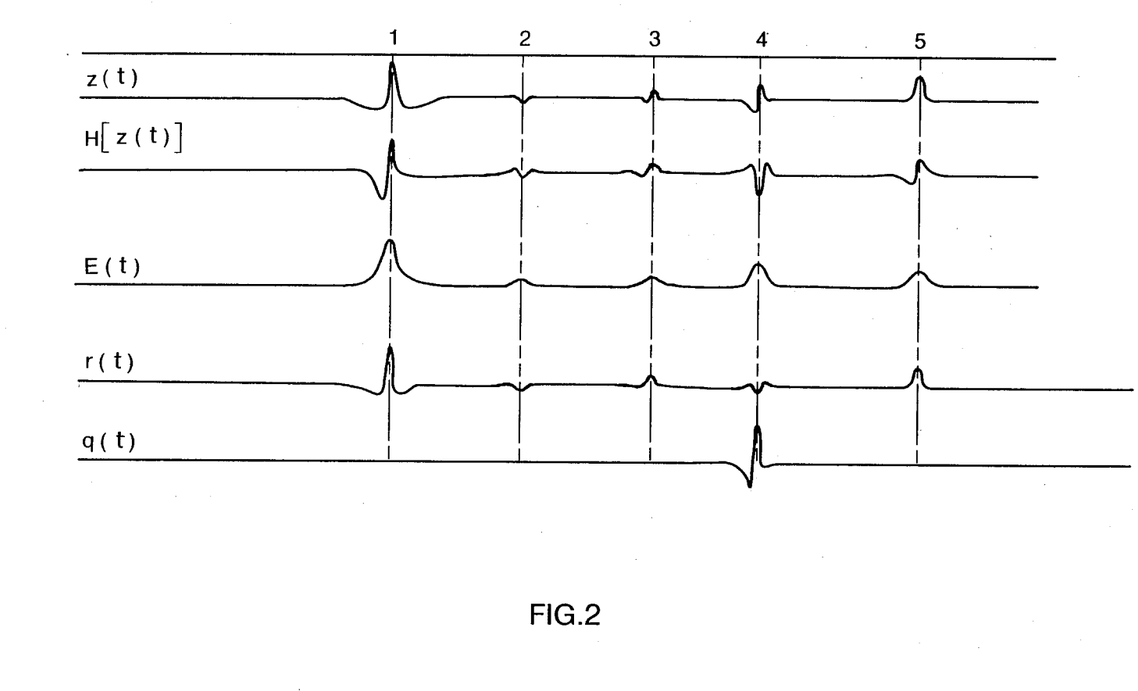
FIG. 2 is a stepwise representation process of the present invention applied to a seismic signal representative of the earth's response to imparted seismic energy.

Now looking to FIG. 2, a synthetic representation of the present invention as applied to a wiggle trace representative of the deconvolved signal z(t) is shown. Reflection events 1, 2, 3, 4 and 5 are shown on the deconvolved signal z(t). The Hilbert transform of the deconvolved signal z(t) is also shown for the five reflecting events, (1, 2, 3, 4 and 5). Next, the envelope E(t) of the analytical signal S(t) corresponding to the deconvolved signal z(t) is shown. The derived absorptive contrast signal q(t) and the impedance contrast signal r(t) are both shown separately.

By comparing the reflection events in the absorptive contrast signal q(t) and the impedance contrast signal r(t), it can be seen that reflection events 1, 2, 3 and 5 in the deconvolved signal z(t) are represented in the impedance contrast signal r(t), but not on the absorptive contrast signal q(t). That is, reflection events 1, 2, 3 and 5 have occurred at reflecting boundaries between media in which absorption effects in the vicinity of the reflecting boundary are negligible. Therefore, conclusions about the elastic properties, density and velocity of the synthesized subterranean formations, drawn from the deconvolved signal z(t) on the basis of a purely elastic model would be correct. However, the reflection event 4 has components in both the absorptive contrast signal q(t) and the impedance contrast signal r(t). That is, the reflection event 4 has occurred at a reflecting boundary where one of the synthesized subterranean formations has significant absorptive losses. Therefore, conclusions drawn from the deconvolved signal z(t) on the basis of a purely elastic model for the earth's subterranean formations for reflection event 4 would have been incorrect.

With the present method of decomposing the deconvolved signal z(t) into two signals, representing both the elastic and anelastic properties of the earth, the impedance contrast signal r(t) can be correctly used to draw conclusions about the earth's elastic properties, i.e. densities and velocities, which contributed to reflection event 4 and the absorptive contrast signal q(t) can be used to draw conclusions about the anelastic properties of the earth which contributed to reflection event 4.

Figure 3:
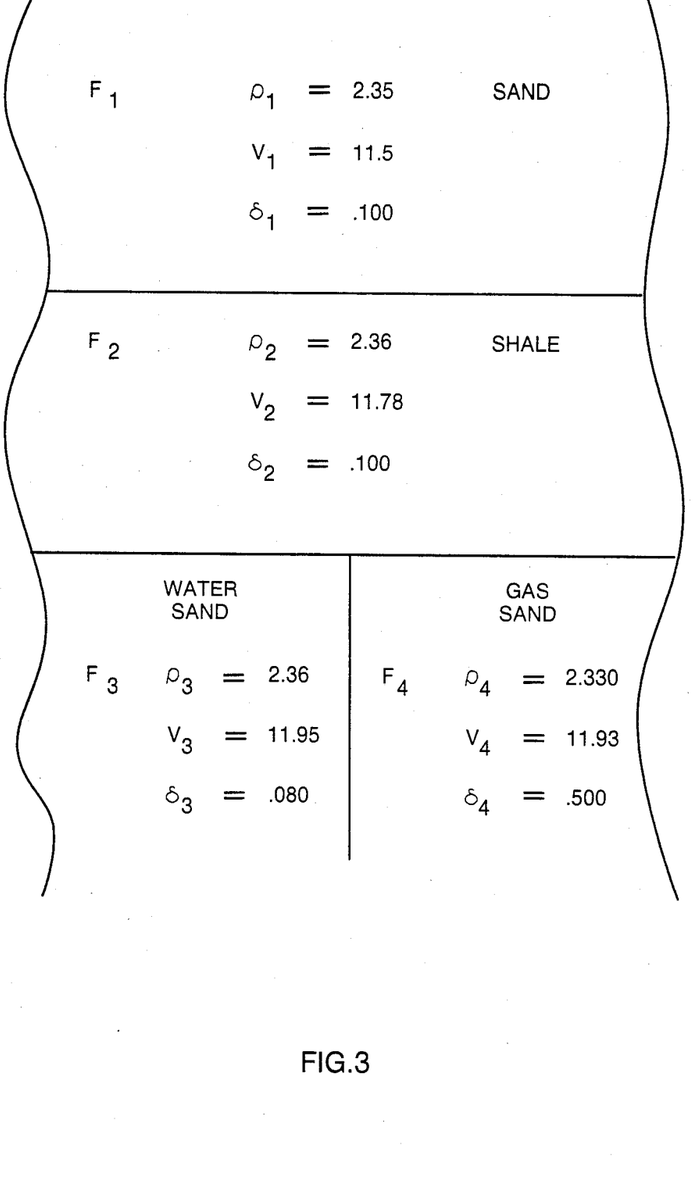
FIG. 3 is a cross-sectional representation of the earth's subterranean formations.

Looking at FIG. 3, a cross-sectional representation of the earth's subterranean formations is shown, wherein four separate formations, $F_1$, $F_2$, $F_3$, and $F_4$, have been shown.

The uppermost formation $F_1$ is a sandstone having the following properties:

$\rho$(density—gm/cc)=2.35,
V (velocity—K ft/sec)=11.5
$\delta$(loss decrement)=0.1

Formation $F_2$ is a shale having the following properties:

$\rho$=2.36,
V=11.78 and
$\delta$=0.1

Formation $F_3$ is a water-saturated sandstone having the following properties:

$\rho$=2.36,
V=11.95, and
$\delta$=0.08

Formation $F_4$ is a gas-saturated sandstone having the following properties:

$\rho$=2.33,
V=11.93, and
$\delta$=0.5

Figure 4:
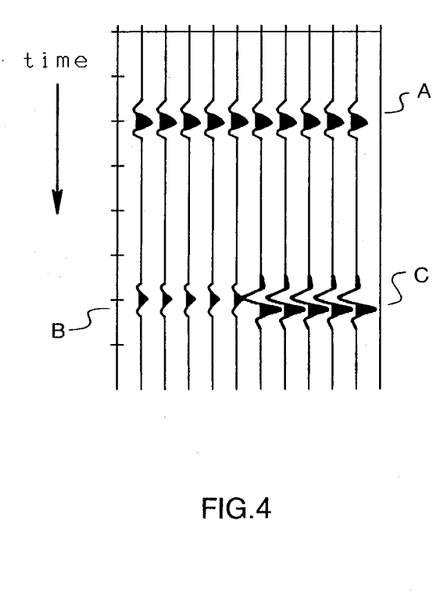
FIG. 4 is a conventional seismic section representation prior to decomposition of the seismic signal into its elastic and anelastic components signals.

Now looking to FIG. 4, a conventional seismic section produced from deconvolved signal z(t) depicting the reflecting boundaries of FIG. 3 is shown. Here it can be seen that a reflection event A corresponding to the reflecting boundary between Formations $F_1$ and $F_2$ is shown, a reflection event B corresponding to the reflecting boundary between Formations $F_2$ and $F_3$ is shown, as well as a reflecting event C corresponding to the reflecting boundary between Formations $F_2$ and $F_4$ is shown. In particular, it should be noted that a significant phase shift has occurred at the reflecting boundary between Formation $F_2$ and $F_4$ in reflection event C.

Figure 5:
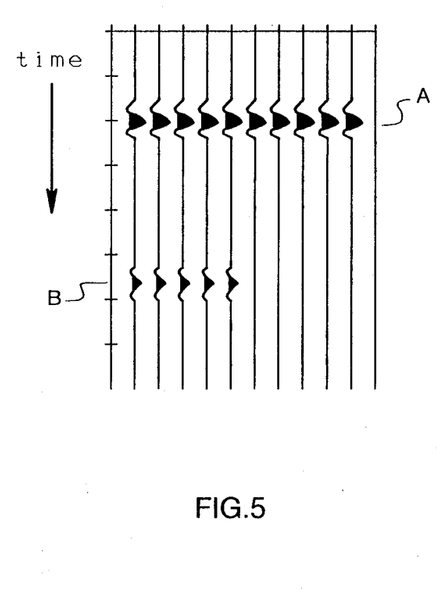
FIG. 5 is a seismic section representative of the impedance contrast and elastic component signal of the earth's subterranean formations at reflecting boundaries of FIG. 3.
Figure 6:
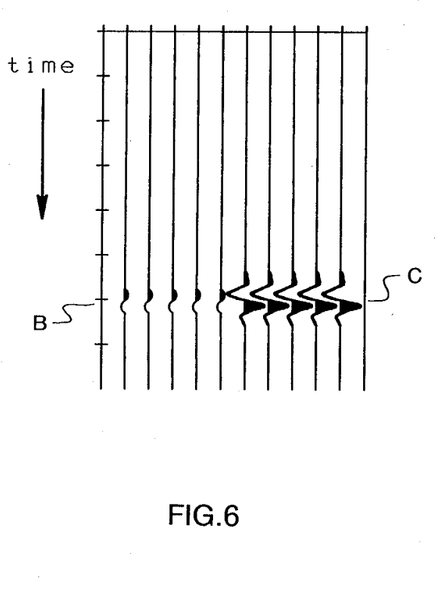
FIG. 6 is a seismic section representative of the absorptive contrast and anelastic component signal of the earth's subterranean formations at reflecting boundaries of FIG. 3.

Now, looking at FIG. 5, a seismic section produced from the impedance contrast signal r(t) is shown. It should be noted that only the reflection events A and B are indicated on this section with no indication of reflection event C. The absence of reflection event C at the reflecting boundary between Formations $F_2$ and $F_4$ is consistent with its zero impedance contrast. However, now looking to FIG. 6, the absorptive contrast signal q(t) is plotted as a seismic section and the reflecting events B and C are shown corresponding to the reflecting boundary between Formations $F_2$ and $F_3$, and $F_2$ and $F_4$. Nowhere in the prior art would it have been expected, employing elastic theory, that reflection event C would have occurred. Reflecting event B occurs in both FIGS. 5 and 6 because the reflecting boundary includes both impedance and absorptive contrast, while reflection event C occurs only in FIG. 6 because the reflection boundary includes only absorptive contrast.

As such, the present invention provides means for distinguishing a gas-filled formation from a similar formation containing liquid. The ability to further classify formations greatly expands the exploration geophysicist's capabilities.

In view of the foregoing illustrations and description of the invention, it may become apparent to those skilled in the art that certain other modifications can be made. It is understood by those skilled in the art that seismic wave energy can be imparted in a number of environments, e.g., borehole televiewer or volumetric scanner, vertical seismic profile, and in marine environments. However, it is not the intent of the present invention to be limited to a specific bandwidth of energy, i.e., "seismic". Rather, the present invention provides a method for analyzing a broad frequency spectrum of reflected wave energy. Furthermore, the present invention is not limited to obtaining measures of the elastic and anelastic properties of the earth's subterranean formations but, rather, the present invention provides a method for evaluating the elastic and anelastic properties of material in general. It is intended that all such modifications fall within the scope of the following claims.

We claim:

1. A method for separating the effects of absorptive and impedance properties of the earth's subterranean formations in a seismic trace signal representative of the earth's response to imparted seismic energy, comprising the steps of:
    (a) deconvolving a seismic source signature from the seismic trace signal and obtaining a deconvolved signal;
    (b) decomposing the deconvolved signal into a first resultant seismic trace signal representative of the absorptive contrast across reflecting boundaries in the earth's subterranean formations; and
    (c) decomposing the deconvolved signal into a second resultant seismic trace signal representative of the impedance contrast across reflecting boundaries in the earth's subterranean formations.

2. A method of claim 1 further including the step of obtaining an estimate of the elastic properties of the earth's subterranean formations from the impedance contrast.

3. The method of claim 1 further including the step of obtaining an estimate of the anelastic properties of the earth's subterranean formation from the absorptive contrast.

4. The method of claim 1 wherein the step of decomposing the deconvolved signal into a first resultant seismic trace signal representative of the absorptive contrast across a reflecting boundary in the earth's subterranean formations includes the steps of:
    (a) obtaining an analytical signal from the deconvolved signal;
    (b) obtaining a measure of the envelope of the analytical signal;
    (c) obtaining a measure of the instantaneous phase angle of the analytical signal;

(d) obtaining a measure of the instantaneous phase angle at maxima in the envelope of the analytical signal; and (e) combining a measure of the analytical signal and a measure of the instantaneous phase angle at maxima in the envelope of the analytical signal to obtain an absorptive contrast signal.

5. The method of claim 4 further including the step of applying a Fourier transform to the absorptive contrast signal to obtain a measure of the earth's anelastic properties.

6. The method of claim 4 further including the step of displaying the absorptive contrast signal as a seismic section.

7. The method of claim 4 further including the step of combining the deconvolved seismic signal and the absorptive contrast signal to obtain an impedance contrast signal.

8. The method of claim 1 wherein the step of decomposing the deconvolved signal into a second resultant seismic trace signal representative of the impedance contrast across the reflecting boundary near subterranean formation includes the steps of:

(a) obtaining an analytical signal from the deconvolved signal;

(b) obtaining a measure of the envelope of the analytical signal;

(c) obtaining a measure of the instantaneous phase angle of the analytical signal;

(d) obtaining a measure of the instantaneous phase angle at maxima in the envelope of the analytical signal; and (e) combining the analytical signal and a measure of the instantaneous phase angle at maxima in the envelope of the analytical signal to obtain an impedance contrast signal.

9. The method of claim 8 further including the step of applying a Fourier transform to the impedance contrast signal to obtain a measure of the earth's elastic properties.

10. The method of claim 8 further including the step of displaying the impedance contrast signal as a seismic section.

11. The method of claim 8 further including the step of combining the deconvolved signal and the impedance contrast signal to obtain an absorptive contrast signal.

12. The method of claim 1 further including the steps of obtaining a frequency dependent estimate of elastic and anelastic properties of the earth's subterranean formations from the first resultant seismic trace signal representative of impedance contrast and the second resultant seismic trace signal representative of absorptive contrast, respectively.

13. A method for separating the effects of impedance and absorptive properties of the earth's subterranean formations in a seismic trace signal representative of the earth's response to imparted seismic energy comprising the steps of:

(a) deconvolving a seismic source signature from the seismic trace signal and obtaining a deconvolved signal;

(b) decomposing the deconvolved signal into a first resultant seismic trace signal representative of the absorptive contrast across reflecting boundaries in the earth's subterranean formations; and (c) combining the second resultant seismic trace signal representative of absorptive contrast and the deconvolved seismic signal to obtain a second resultant seismic trace signal representative of the impedance contrast across reflecting boundaries in the earth's subterranean formations.

14. The method of claim 13 further including the step of obtaining an estimate of the elastic properties of the earth's subterranean formations from the impedance contrast.

15. The method of claim 13 further including the step of obtaining an estimate of the earth's anelastic properties of the earth's subterranean formations from the absorptive contrast.

16. The method of claim 13 further including the step of displaying the first resultant seismic trace signal representative of impedance contrast as a seismic section.

17. The method of claim 13 further including the step of displaying the second resultant seismic trace signal representative of absorptive contrast as a seismic section.

18. A method for separating the effects of the impedance and absorptive properties of the earth's subterranean formations in a seismic trace signal representative of the earth's response to imparted seismic energy comprising the steps of:

(a) deconvolving a seismic source signature from the seismic trace signal and obtaining a deconvolved signal;

(b) decomposing the deconvolved signal into a first resultant seismic trace signal representative of the impedance contrast across the reflecting boundary in the earth's subterranean formations; and (c) combining the impedance contrast signal and the deconvolved seismic signal to obtain a second resultant seismic trace signal representative of the absorptive contrast across reflecting boundaries in the earth's subterranean formations.

19. The method of claim 18 further including the step of obtaining an estimate of the anelastic properties of the earth's subterranean formations from the absorptive contrast.

20. The method of claim 18 further including the step of obtaining an estimate of the elastic properties of the earth's subterranean formations from the absorptive contrast.

21. The method of claim 18 further including the step of displaying the first resultant seismic trace signal representative of impedance contrast as a seismic section.

22. The method of claim 18 further including the step of displaying the second resultant seismic trace signal representative of absorptive contrast as a seismic section.

23. A method of separating the elastic and anelastic properties of the earth's subterranean formation from a seismic trace signal representative of the earth's response to a seismic energy imparted by seismic source comprising the steps of:

(a) deconvolving a seismic source signature from the seismic trace signal and obtaining a deconvolved signal;

(b) decompositing the deconvolved signal into an elastic component signal representative of the differences in elastic properties across reflecting boundaries in the earth's subterranean formations;

(c) obtaining estimates of the elastic characteristics of the earth's subterranean formation from the elastic component signal;

(d) decomposing the deconvolved signal into an anelastic component signal representative of the differences in anelastic properties across reflecting boundaries in the earth's subterranean formations; and (e) obtaining estimates of the anelastic properties of the earth's subterranean formations from the anelastic component signal.

24. The method of claim 23 further including the step of displaying the elastic component signal as a seismic section.

25. The method of claim 23 further including the step of displaying the anelastic component signal as a seismic section.

26. A method of distinguishing a gas-bearing subterranean formation from a liquid-bearing subterranean formation comprising the steps of (a) obtaining a seismic trace signal representative of the earth's response to seismic energy imparted therein;

(b) decomposing seismic trace signal into an elastic comonent signal representative of the differences in elastic formation properties across reflecting boundaries;

(c) decomposing the seismic trace signal into anelastic component signal representative of the differences in anelastic formation properties across reflecting boundary; and (d) comparing the elastic component signal with the anelastic component signal to distinguish a gas-bearing formation from a liquid-bearing formation.

27. A method for separating the effects of anelastic and elastic contrast in the earth's subterranean formations in a seismic trace signal representative of the earth's response to imparted seismic energy, comprising the steps of:

(a) separating a seismic source signature from the seismic trace signal and obtaining a deconvolved signal;

(b) forming an analytical signal from the deconvolved signal and its Hilbert transform;

(c) determining a response phase for the analytical signal;

(d) obtaining a first resulant seismic trace signal representative of the elastic contrasts in the earth's subterranean formations from the deconvolved seismic signal and its Hilbert transform, and the response phase; and (e) obtaining a second resultant seismic trace signal representative of anelastic contrasts in the earth's subterranean formations from the deconvolved signal and its Hilbert transform, and the response phase.

28. The method of claim 27 further including the step of Fourier transforming the first resultant seismic trace signal representative of elastic contrasts in the earth's subterranean formations and obtaining measures of the earth's impedance properties.

29. The method of claim 28 wherein the measures of the earth's impedance properties includes formation velocity and density.

30. The method of claim 27 further including the step of displaying the first resultant seismic trace signal representative of elastic contrasts in the earth's subterranean formation as a seismic section.

31. The method of claim 27 further including the step of Fourier transforming the second resultant seismic trace signal representative of anelastic contrasts in the earth's subterranean formations and obtaining measures of the earth's absorptive properties.

32. The method of claim 31 wherein the measures of the earth's absorptive properties include formation logarithmic decrement and absorptive coefficients.

33. The method of claim 27 further including the step of displaying the second resultant seismic trace signal representative of the anelastic contrasts in the earth's subterranean formation as a seismic section.

* * * * *

UNITED STATES PATENT OFFICE
CERTIFICATE OF CORRECTION

PATENT NO. : 4,729,101
DATED : March 1, 1988
INVENTOR(S) : Kenneth E. Hanson, et al It is certified that error appears in the above-identified patent and that said Letters Patent are hereby corrected as shown below:

Column 6, line 1, remove "(" in front of q.

Claim 23, Column 10, line 65, "formation" should read --formations--.

Claim 26, Column 11, line 21, "comonent" should read --component--.

Signed and Sealed this

Ninth Day of August, 1988

Attest:

DONALD J. QUIGG

Attesting Officer

Commissioner of Patents and Trademarks